United States Patent
Kim et al.

(10) Patent No.: US 8,095,973 B2
(45) Date of Patent: Jan. 10, 2012

(54) APPARATUS AND METHOD FOR DETECTING NETWORK ATTACK

(75) Inventors: Ik Kyun Kim, Daejeon (KR); Yang Seo Choi, Daejeon (KR); Dae Won Kim, Daejeon (KR); Jin Tae Oh, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1107 days.

(21) Appl. No.: 11/926,132

(22) Filed: Oct. 29, 2007

(65) Prior Publication Data

US 2008/0134334 A1 Jun. 5, 2008

(30) Foreign Application Priority Data

Nov. 30, 2006 (KR) .................. 10-2006-0120259
Apr. 17, 2007 (KR) .................. 10-2007-0037488

(51) Int. Cl.
G06F 9/00 (2006.01)
G06F 15/16 (2006.01)
G06F 17/00 (2006.01)
G06F 11/00 (2006.01)
G06F 12/14 (2006.01)
G06F 12/16 (2006.01)
G08B 23/00 (2006.01)

(52) U.S. Cl. ........................... 726/13; 726/23
(58) Field of Classification Search .............. 726/13, 726/23

See application file for complete search history.

(56) References Cited

U.S. PATENT DOCUMENTS

| 2004/0215972 A1* | 10/2004 | Sung et al. .................. 713/201 |
| 2005/0259660 A1* | 11/2005 | Gassoway ..................... 370/394 |
| 2006/0107055 A1 | 5/2006 | Panwar et al. |
| 2008/0307524 A1* | 12/2008 | Singh et al. ..................... 726/22 |
| 2009/0328185 A1* | 12/2009 | Berg et al. ..................... 726/13 |

FOREIGN PATENT DOCUMENTS

| KR | 10-2003-0042872 A | 6/2003 |
| KR | 1020040013173 A | 2/2004 |
| KR | 10-2006-0055147 A | 5/2006 |
| KR | 10-2006-0067117 A | 6/2006 |
| WO | WO 2006/069041 A2 | 6/2006 |

OTHER PUBLICATIONS

Toth T. et al., "Accurate Buffer Overflow Detection via Abstract Payload Execution," *RAID 2002* 274-291 (Feb. 2002).
Kruegel, Christopher, et al., Polymorphic Worm Detection Using Structural Information of Executables, *RAID 2005* 207-226 (Apr. 2005).

* cited by examiner

*Primary Examiner* — Kambiz Zand
*Assistant Examiner* — Benjamin Kaplan (57) ABSTRACT

There are provided a network attack detection apparatus and method capable of determining even unknown network attack, the apparatus connected between two networks or connected by port mirroring of an Ethernet switch to real-time monitor all packets flowing through the networks. The apparatus decodes a payload portion of an inputted network packet into a machine code instruction, determines whether an executable code is included in the decoded machine code by analyzing relationship between instructions, and determines whether the packet is harmful based on statistics with respect to a possibility that an executable code exists in a service and a certain transaction of the service when the executable code is included.

15 Claims, 8 Drawing Sheets

APPARATUS AND METHOD FOR DETECTING NETWORK ATTACK

CROSS-REFERENCE TO RELATED APPLICATIONS

This application claims the priority of Korean Patent Application No. 10-2007-0037488 filed on Apr. 17, 2007, and the priority of Korean patent Application No. 10-2006-120259 filed on Nov. 30, 2006, in the Korean Intellectual Property Office, the disclosure of which is incorporated herein by reference.

BACKGROUND OF THE INVENTION

1. Field of the Invention

The present invention relates to an apparatus and method for quickly and accurately detecting an unknown network attack, the apparatus connected between two networks or connected by port mirroring of an Ethernet switch to real-time monitor all packets flowing through the networks.

This work was supported by the IT R&D program of MIC/IITA. [2006-S-024-01, "Development of Signature Generation and Management Technology against Zero-day Attack]

2. Description of the Related Art

Currently, as methods used for detecting an attack in intrusion detection systems (IDSs) and intrusion prevention systems (IPSs), there are a method of using abnormal traffic detection and a method of detecting by using a unique signature included in an attack packet.

In the case of the method of using abnormal traffic detection, characteristics of traffic caused by an attack is analyzed to detect the attack, regardless of vulnerability used for the attack, which is capable of being generally used to network attacks but has a high false positive rate. Accordingly, currently, most of commercial IDSs and IPSs, the abnormal traffic detection function is inactively used.

On the other hand, the method of using a unique signature included in an attack packet is currently used in most of integrated firewalls and IDSs and IPSs, which is capable of quickly and accurately detecting and preventing an attack by comparing a packet on a network with a unique signature extracted from an attack packet. However, so far, since an attack signature is generated by hand due to lack of a technology for generating a signature used for detection, it may be considered that an effective defense system against variant worms and unknown attacks is not yet formed due to a delay in generating the signature used for detection.

Accordingly, a new technology capable of detecting unknown network attacks is required.

Particularly, a function of detecting unknown attacks is not only important in itself but also is more significant in an aspect of generating a new detection signature by using the function. Accordingly, for continuous progress of an information protection field, it is required to automatically detect unknown attacks in real-time and apply a result thereof.

SUMMARY OF THE INVENTION

An aspect of the present invention provides an apparatus and method for detecting an unknown network attack for quickly and accurately detecting an unknown network attack, the apparatus connected between two networks or connected by port mirroring of an Ethernet switch to real-time monitor all packets flowing through the networks.

According to an aspect of the present invention, there is provided a network attack detection apparatus including: a binary filter decoding a payload portion of an inputted network packet into a machine code instruction to convert into a pseudo-machine code; a code analyzer analyzing a relation between instructions with respect to the pseudo-machine code decoded by the binary filter and determining whether the network packet includes an executable code; and a protocol checker, with respect to the network packet determined by the code analyzer as including the executable code, determining whether the network packet is a harmful packet based on statistics on a possibility in which an executable code exists in a service and a transaction.

According to another aspect of the present invention, there is provided a method of detecting a network attack, the method including: determining whether an executable code is included in a network packet; determining a possibility in which a normally executable code is included in the network packet; and determining the network packet is harmful, based on the whether an executable code is included and the possibility in which a normally executable code is included.

Unknown attacks in new forms, which cannot be detected in conventional unique signature-based IDSs and IPSs, also include characteristics surely included in attacks.

In detail, new viruses, worms, and bots, which currently show high infection rates, also surely include vicious executable codes in a network code, similar to other known attacks.

Accordingly, when a network packet includes an executable code, a possibility in which the network packet is an attack packet is fully high. When the network packet includes characteristics included in a vicious code, the network packet may be considered as a kind of an attack packet.

To apply the described above to attack detection technologies, vicious executable codes included in all network packets should be detected, and more particularly, all packets transferred to a gigabit network should be checked without loss and it should be determined whether executable codes exist. Hereupon, an aspect of the present invention provides an apparatus and method therefor.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. Only, in describing operations of the exemplary embodiments in detail, when it is considered that a detailed description on related well-known functions or constitutions unnecessarily may make essential points of the present invention be unclear, the detailed description will be omitted.

In the drawings, the same reference numerals are used throughout to designate the same or similar components.

In addition, throughout the specification, when it is describe that a part is "connected to" another part, this includes not only a case of "being directly connected to" but also a case of "being indirectly connected to" interposing another device therebetween. Also, when it is described that an apparatus "includes" an element and there is no opposite description thereof, this is not designate that the apparatus excludes other elements but designates that the apparatus may further include other elements.

Figure 1:
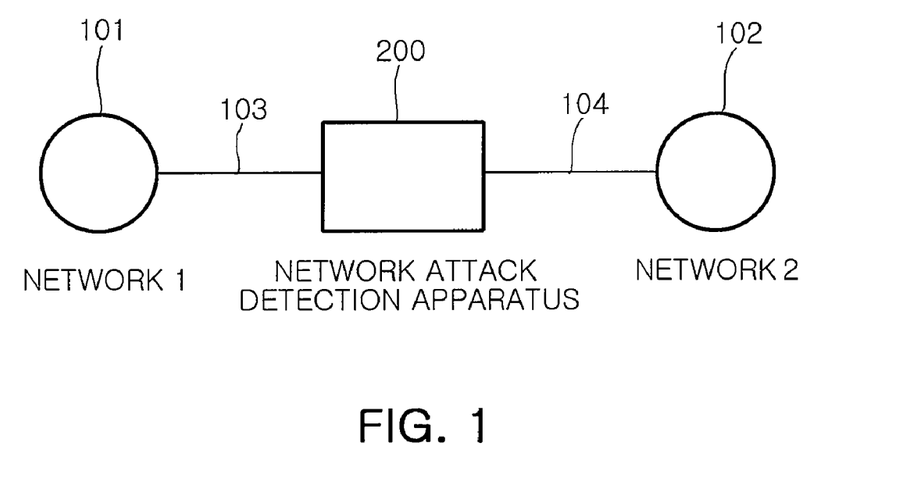
FIG. 1 is a block diagram illustrating a network configuration to which a network attack detection apparatus according to an embodiment of the present invention is applied.

FIG. 1 is a block diagram illustrating a network configuration to which a network attack detection apparatus 200 (hereinafter, referred to as "attack detection apparatus 200") according to an embodiment of the present invention is applied. Referring to FIG. 1, two networks 101 and 102 are connected to the attack detection apparatus 200 for detecting unknown network attacks via gigabit Ethernet interfaces 103 and 104. Accordingly, all network packets passing through the two networks 101 and 102 pass through the attack detection apparatus 200, and the attack detection apparatus 200 monitors the network packets in real time and detects harmful traffic. Hereinafter, the configuration and functions of the attack detection apparatus 200 will be described in detail.

Figure 2:
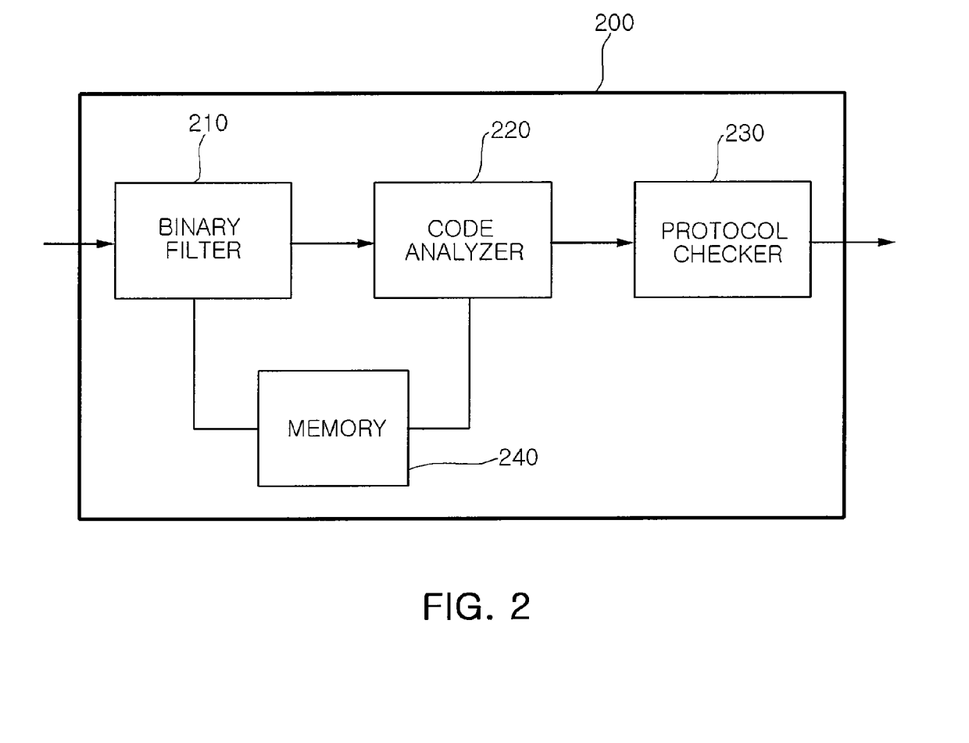
FIG. 2 is a block diagram illustrating an overall configuration of the network attack detection apparatus of FIG. 1.

FIG. 2 is a block diagram illustrating a detailed configuration of the attack detection apparatus 200.

As shown in FIG. 2, the attack detection apparatus 200 includes a binary filter 210, a code analyzer 220, a protocol checker 230, and a memory 240.

The binary filter 210 is directly connected to an external gigabit Ethernet interface connected to a network and decodes and stores payload portions of all packets input from the network into a machine code instruction in the memory 240. The process is similar to a process of disassembling a binary portion of general execution files. In the present invention, the payload portion of the network packets decoded by the binary filter 210 may be stored as a meaning pseudo-machine code more than two bytes. Actually, irrelevant to whether a payload portion of a network packet includes an executable code or not, the process may be performed without error since 256 of machine code values, each of which one byte, may be analyzed as meaning instructions, and even, pseudo-machine codes may be generated by disassembling general random data.

That is, the binary filter 210 decodes the payload portion of the inputted network packet into the pseudo-machine code, irrelevant to whether the generated pseudo-machine code has a meaning.

The code analyzer 220 analyzes code spectrum of the pseudo-machine code stored in the memory 240 and relationship between instructions to determine whether the network packet includes an executable code.

The protocol checker 230 finally determines whether the network packet is harmful based on statistics on a possibility in which an executable code exists in a service and certain transaction thereof such as HTTP GET, with respect to the network packet determined by the code analyzer 220 as including an executable code.

That is, the attack detection apparatus 200 determines whether an executable code is included in a network packet, checks whether the executable code is vicious based on preset statistics when the executable code is included, and determines whether the network packet is harmful.

Hereinafter, detailed configurations and operations of the respective elements of the attack detection apparatus 200 will be described, thereby clearly understanding a process of network attack detection according to an exemplary embodiment of the present invention.

Figure 3:
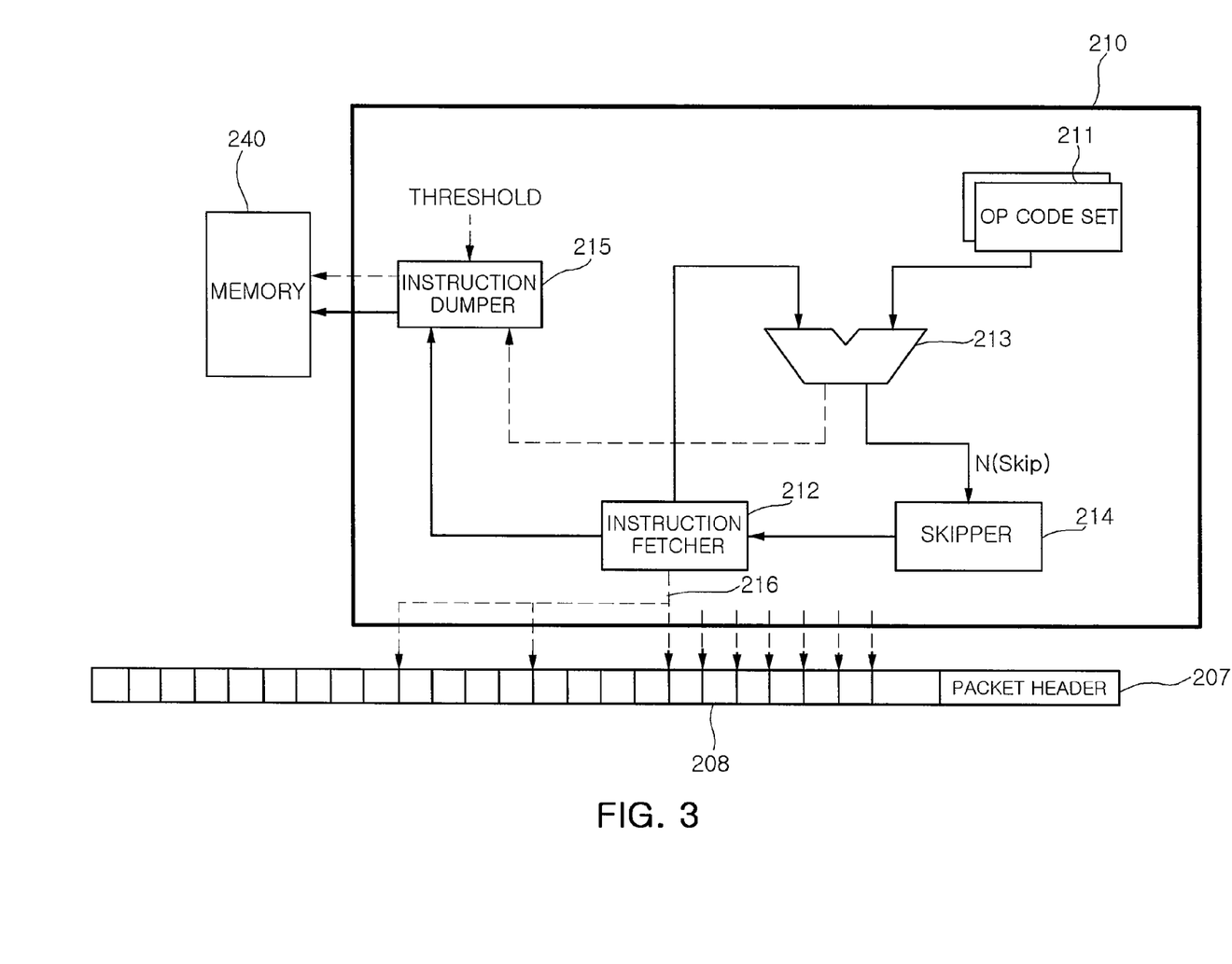
FIG. 3 is a block diagram illustrating a detailed configuration of a binary filter of the network attack detection apparatus of FIG. 1.

FIG. 3 is a block diagram illustrating an internal structure of the binary filter 210.

The binary filter 210 is directly connected to a gigabit Ethernet interface connected to an external network and decodes a payload portion of a network packet inputted from the network at high speed while assuming the payload portion as a binary executing code.

The binary filter 210 includes an operation code (OP code) set 211, an instruction fetcher 212, a comparator 213, a skipper 214, and an instruction dumper 215.

The instruction fetcher 212 fetches an instruction by recognizing an independent instruction from an initial portion of a payload 208 of an inputted network packet 207. The instruction fetched by the instruction fetcher 212 is transferred to the comparator 213 and the instruction dumper 215. The instruction dumper 215 stores the received instruction in the memory 240.

The comparator 213 compares the fetched instruction with instruction in the OP code set 211 previously stored and notifies a size of an instruction to be fetched by considering sizes of the fetched instruction and OP codes to the skipper 214. In detail, when the fetched instruction is meaningless data, the skipper 214 is driven by one byte to discard the byte.

In this case, when the instruction fetched by the instruction fetcher 212 is meaning data, the instruction is stored in the memory 240 via the instruction dumper 215. When the instruction is meaningless data, the instruction is discarded by one byte.

In the present invention, to determine whether an executable code is included by using the fetched instructions as described above, a certain number of fetched instructions are required.

Accordingly, in the present invention, to increase accuracy of a determination result, the least number of instructions required to determine whether an executable code exists is set as a threshold. When the number of fetched instructions stored in the instruction dumper is higher than the threshold, the fetched instructions are stored in the memory 240.

A series of processes performed in the binary filter 210 may be understood as processes of disassembling and storing a payload portion of a network packet at high speed in the memory 240.

In the process, data stored in the memory 240 are in the form of a pseudo-machine code and becomes a set of instructions just mechanically decoded, and more particularly, a set of codes simply interpreted without basis for determining whether the codes are executable.

When the series of processes with respect to an inputted network packet in the binary filter 210 is finished, the finish is notified to the code analyzer 220. The code analyzer 220 reads the pseudo-machine codes with respect to the payload portion of the network packet stored in the memory 240 and determines whether the codes are executable.

Figure 4:
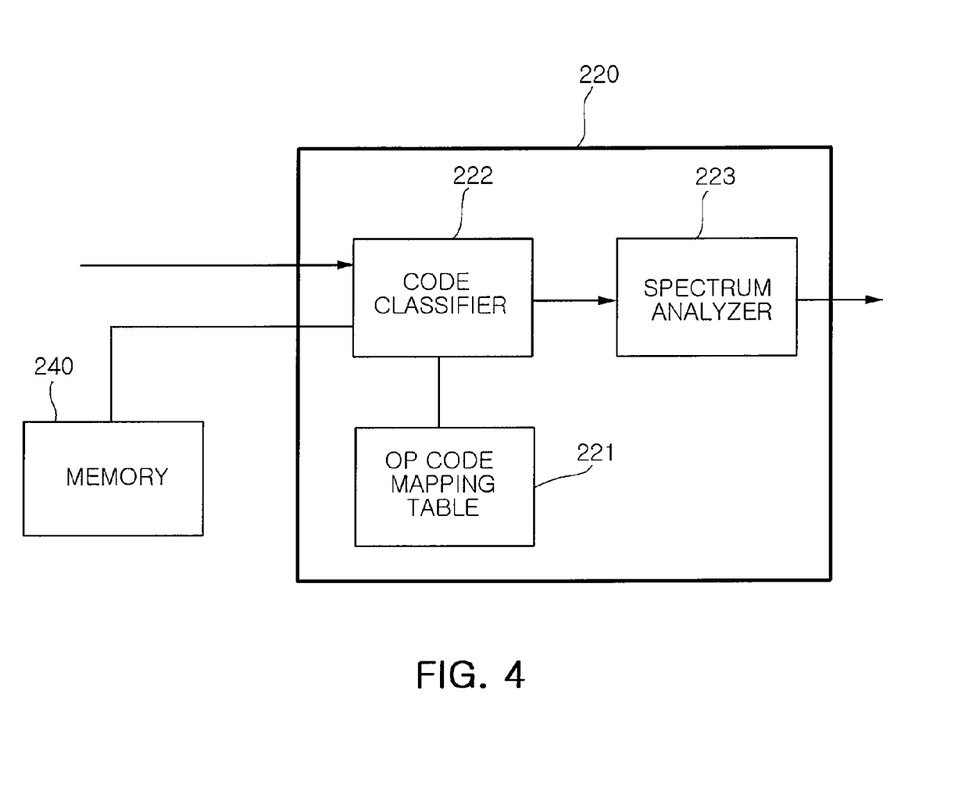
FIG. 4 is a block diagram illustrating a detailed configuration of a code analyzer of the network attack detection apparatus of FIG. 1.

FIG. 4 is a block diagram illustrating an internal configuration of the code analyzer 220.

Referring to FIG. 4, the code analyzer 220 includes an OP code mapping table 221, a code classifier 222, and a spectrum analyzer 223 and determines whether pseudo-machine codes simply decoded and stored in the memory 240 are executable.

For this, a meaning set corresponding to each OP code of machine codes is mapped and stored in the OP code mapping table 221.

Referring to OP code mapping table 221, the code classifier 222 classifies hundreds of machine codes into a predetermined number, for example, 9 of meaning sets. That is, the meaning sets are classified for each meaning of an instruction.

In the case of only one instruction, there are various machine code values depending on options thereof. For example, in the case of Intel IA32 machine codes, there are a large number of code values such as ADD (0x00, 0x01, 0x02, . . . ), ADC (0x10, 0x11, 0x12, . . . ), and SUB (0x28, 0x29, 0x2a, 0x2b, . . . ). It is required to classify the code values for each meaning group.

Figure 5:
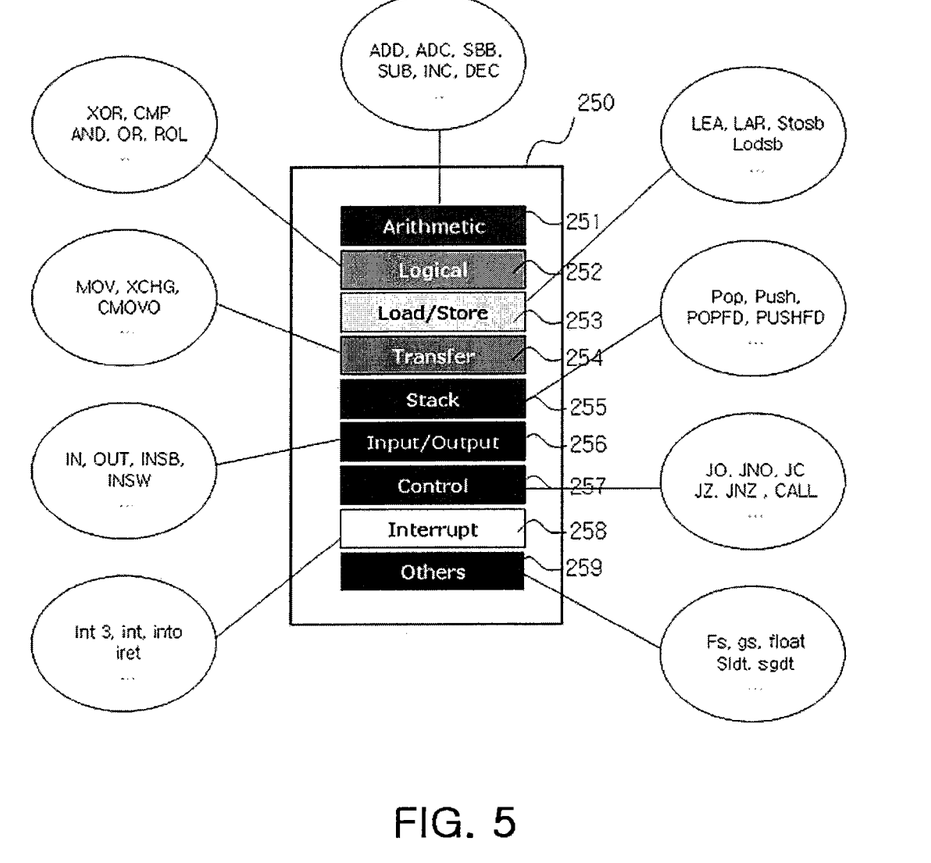
FIG. 5 is a diagram illustrating an example of code classification in the code analyzer of FIG. 4.

FIG. 5 is a diagram illustrating 9 meaning sets set according to an exemplary embodiment of the present invention.

Referring to FIG. 5, a meaning set 250 includes a code set 251 related to an arithmetic instruction, a code set 252 related to a logical instruction, a code set 253 related to a load/store instruction, a code set 254 related to a transfer instruction, a code set 255 related to a stack instruction, a code set 256 related to an input/output instruction, a code set 257 related to a control instruction, a code set 258 related to an interrupt instruction, and a code set 259 related to others excluding thereof.

Classifying as described above, pseudo-machine codes are capable of being distinguished for each instruction. Also, in the present invention, a unique color is set for each of the meaning set shown in FIG. 5. Pseudo-machine codes of a packet are displayed as the classified colors, thereby displaying the codes of the packet in the form of code spectrum showing relationship between instructions.

Figure 6:
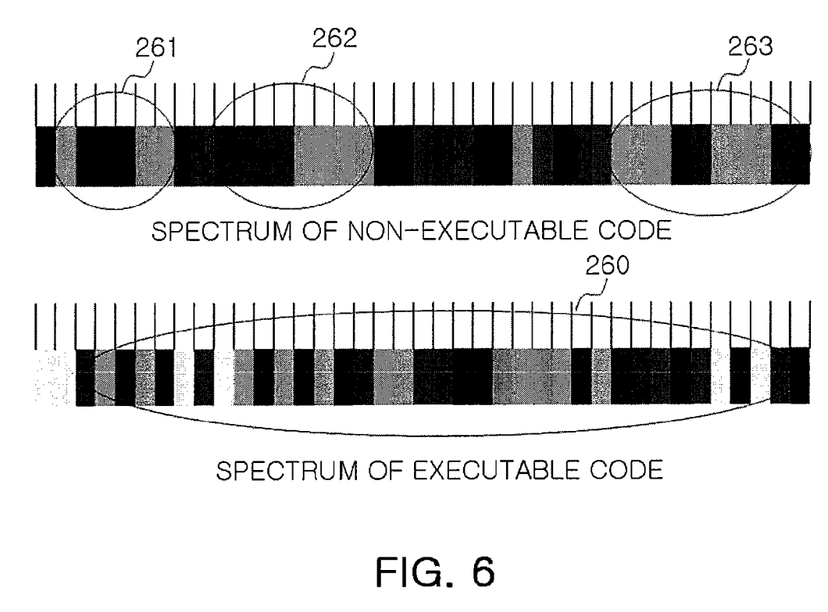
FIG. 6 is a diagram illustrating spectrum patterns of a case in which an executable code is included and a case in which there is no an executable code, according to classification of the code analyzer of FIG. 4.

When classifying machine codes generated by a general compiler into 9 of meaning sets shown in FIG. 5 and displaying colors given to the respective meaning sets, code spectrum is shown as in FIG. 6.

That is, code spectrum has a pattern 260 formed of several colors when a code is executable, and has patterns 261, 262, and 263 in which identical color is repeated when the code is non-executable. That is, machine codes classified into an identical instruction may be consecutively shown when the code is non-executable, but different instructions are repeated in a regular form when the code is executable.

Accordingly, relationship between instructions may be easily known from the code spectrum described above and executable codes may be easily detected therefrom. That is, decoded machine codes are divided into meaning sets shown in FIG. 5 and shown as colors and patterns of code spectrum thereof are analyzed, thereby determining whether including an executable code.

The spectrum analyzer 223 determines whether an executable code is included in a network packet by using the characteristics. The spectrum analyzer 223 analyzes code spectrum outputted from the code classifier 222 and determines whether an executable code exists in a time window having a certain size at a certain point in time. In detail, the code spectrum pattern of the non-executable codes and the code spectrum pattern of the executable codes as shown in FIG. 6 are previously set and code spectrum of an inputted network packet is analyzed. When having a pattern in which an identical color is repeated, codes of the network packet are determined as non-executable. When having a pattern in which different colors are repeatedly shown, codes of the network packet are determined as executable.

A determination result of the spectrum analyzer 223 is transferred to the protocol checker 230.

Figure 7:
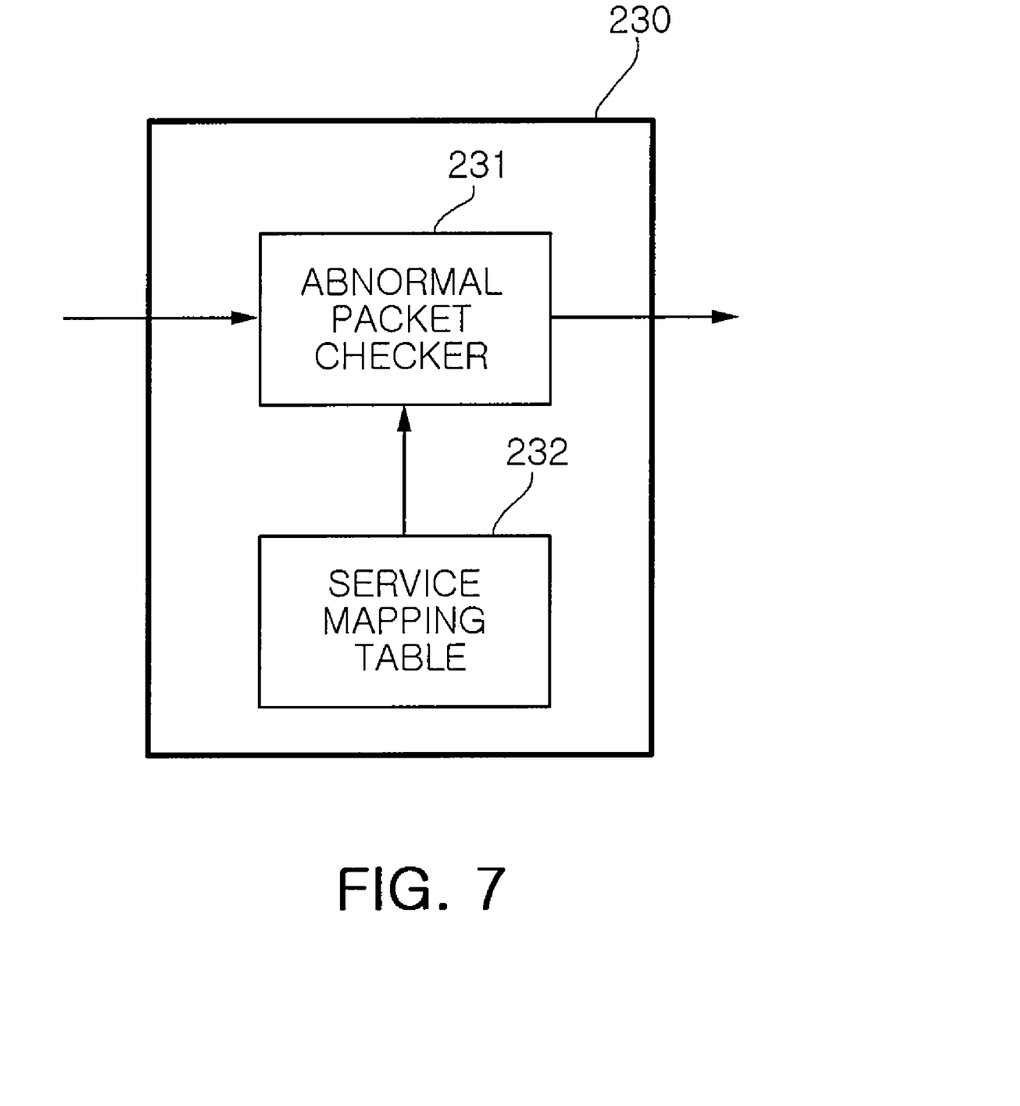
FIG. 7 is a block diagram illustrating a detailed configuration of a protocol checker of the network attack detection apparatus of FIG. 1.

The protocol checker 230 checks a protocol of a network packet determined by the code analyzer 220 as including an executable code based on header information thereof, checks a service and transaction thereof such as HTTP GET, checks statistics on a possibility in which an executable code exists in the checked service and transaction, and finally, determines whether the network packet is harmful. FIG. 7 is a block diagram illustrating an internal configuration illustrating the protocol checker 230.

Referring to FIG. 7, the protocol checker 230 includes an abnormal packet checker 231 and a service mapping table 232.

The service mapping table 232 stores statistics of including an executable code for each service and transaction thereof.

The abnormal packet checker 231 analyzes a protocol of a network packet determined by the code analyzer 220 as including an executable code, checks a related service and transaction, reads statistics in which a packet includes an executable code, with respect to the checked service and transaction from the service mapping table 232, and determines whether the network packet is harmful packet based thereon.

For example, a packet of PUT service and GET service of FTP (TCP 21, 22) has a high possibility of including an executable code. However, it may be considered that there is no possibility in which an executable code exists in a packet in an FTP session control stage. Also, it may be considered that there is no possibility in which an executable code exists in an HTTP GET service. Internet worms using HTTP GET such as a Code Red worm makes an exploit code be included in an HTTP GET service to cause network propagation.

Accordingly, the abnormal packet checker 231 determines a packet as being harmful when there is an executable code in a packet of a service and transaction statistically having little possibility of including an executable code.

The binary filter 210, the code analyzer 220, and the protocol checker 230 included in the attack detection apparatus 200 may be embodied as field-programmable gate array (FPGA) hardware logics and may determine all packets without loss in a several gigabit Ethernet environment.

Figure 8:
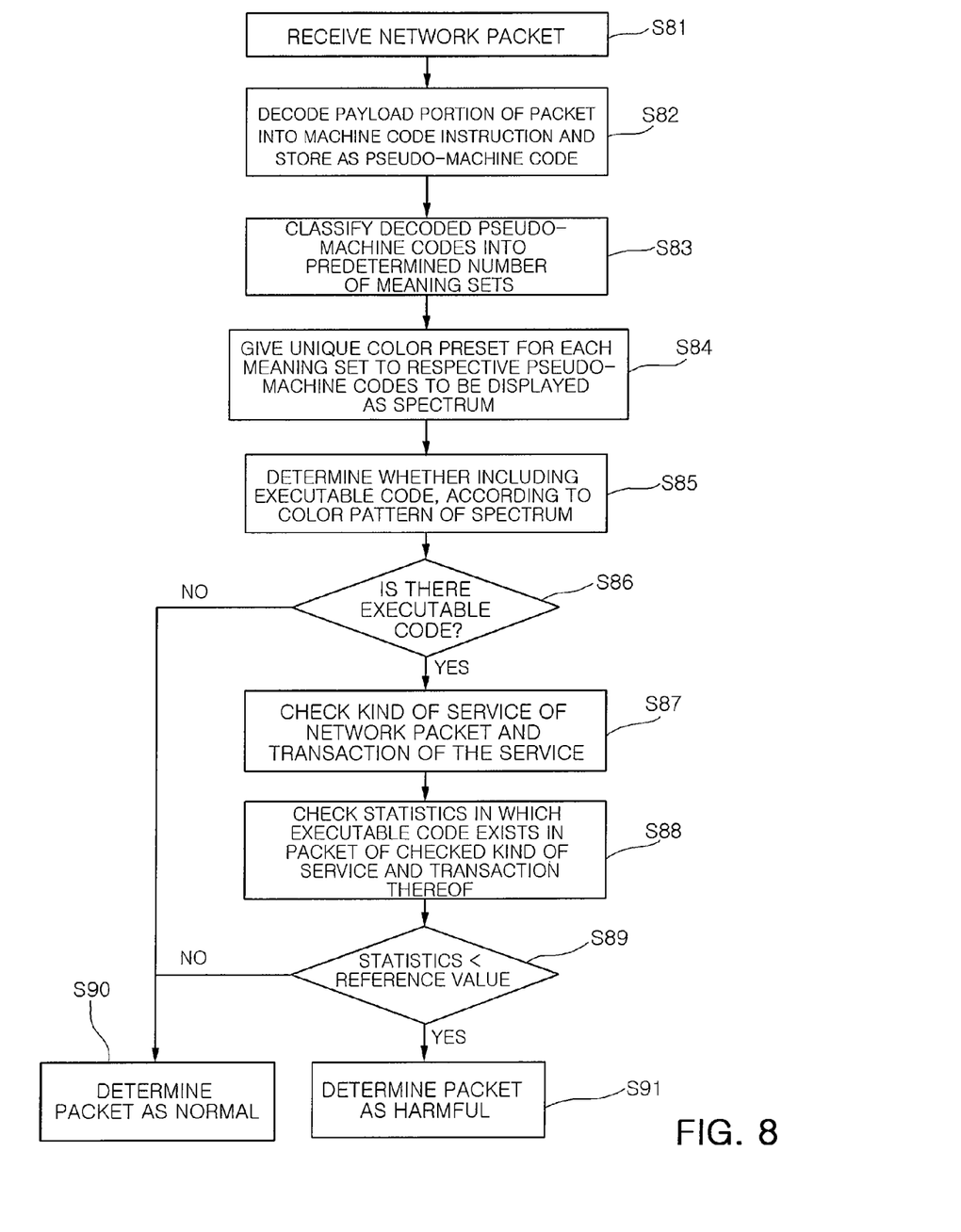
FIG. 8 is a flowchart illustrating a network attack detection method according to an embodiment of the present invention.

FIG. 8 is a flowchart illustrating a method of detecting a network attack in the attack detection apparatus 200 according to an exemplary embodiment of the present invention.

Referring to FIG. 8, the network attack detection method will be described.

When a network packet transferred between two networks or port mirrored is inputted (S81), a payload portion of the network packet is decoded into a machine code instruction to convert into a pseudo-machine code (S82).

The pseudo-machine codes are classified into preset meaning sets (S83), the respective pseudo-machine codes are shown as colors set for each of the preset meaning sets, and code spectrum of the network packet is extracted (S84).

It is determined whether an executable code is included in the network packet by comparing the code spectrum with previously checked code spectrum of a non-executable code and previously checked code spectrum of an executable code (S85).

As a result of the determination, when the network packet includes an executable code (S86), a protocol of the network packet is analyzed based on header information thereof and a related service and transaction thereof are checked (87).

Statistics in which the checked service and transaction include a normally executable code is checked (S88).

When the checked statistics are smaller than a predetermined reference value, that is, when there is less possibility of including an executable code by considering the statistics, since the network packet is considered as including an abnormally executable code, the network packet is determined as a harmful packet (91).

On the other hand, as the result of S85, when there is no executable code or the checked statistics is greater than the predetermined reference value, that is, the possibility of including an executable code is great, the network packet is determined as a normal packet (S90).

As described above, an aspect of the present invention provides an excellent effect of automatically detecting an unknown Internet attack without action of a user by real-time determining whether all packets transferred via a network includes an executable code and determining whether a packet is harmful by using a possibility that an application layer service thereof includes an executable code.

In addition, a total number of network traffics can be checked without loss at a gigabit Ethernet speed, thereby increasing an attack detection rate and real-time processing. Therefore, it is possible not only to quickly process an unknown network intrusion and attack but also to easily embody as a software module or an FPGA hardware component, thereby mounting on a general security system as an additional function and applying as core technology for generating a new attack detection regulation.

While the present invention has been shown and described in connection with the exemplary embodiments, it will be apparent to those skilled in the art that modifications and variations can be made without departing from the spirit and scope of the invention as defined by the appended claims.

What is claimed is:

1. A network attack detection apparatus comprising:
a non-transitory computer-readable medium;
a binary filter configured to decode a payload portion of an inputted network packet into a machine code instruction to convert into a pseudo-machine code;
a code analyzer configured to analyze a relation between instructions with respect to the pseudo-machine code decoded by the binary filter and to determine whether the network packet includes an executable code, the pseudo-machine code being stored in the non-transitory computer-readable medium; and
a protocol checker configured to determine whether the network packet, determined as including the executable code, is a harmful packet based on statistics on the possibility that the executable code exists in a service and a transaction related to the network packet.

2. The apparatus of claim 1, wherein the non-transitory computer-readable medium comprises a memory configured to store the pseudo-machine code of instruction, decoded by the binary filter.

3. The apparatus of claim 2, wherein the binary filter comprises:
an instruction fetcher configured to fetch an instruction by estimating the payload portion of the inputted network packet as a binary code;
a comparator configured to compare the instruction fetched by the instruction fetcher with an instruction of a previously stored operation code set to determine whether the fetched instruction is significant;
an instruction dumper configured to store an instruction determined as a significant instruction by the comparator, as a pseudo-machine code in the memory; and
a skipper configured to skip an instruction determined as an insignificant instruction by the comparator, instead of storing the same.

4. The apparatus of claim 3, wherein the instruction dumper stores in the memory when the number of instructions fetched from a payload portion of one network packet is larger than a predetermined threshold.

5. The apparatus of claim 2, wherein the code analyzer comprises:
an operation code mapping table configured to map and to store a meaning set for each operation code of respective machine codes;
a code classifier configured to classify the pseudo-machine codes decoded by the binary filter into a predetermined number of meaning sets based on the operation code mapping table; and
a spectrum analyzer configured to check code spectrum in a time window having a certain size at a certain point in time based on a classification result of the code classifier and to determine whether the network packet includes the executable code.

6. The apparatus of claim 5, wherein the code analyzer defines a different color for each meaning set and displays the code spectrum as a color pattern.

7. The apparatus of claim 5, wherein the meaning set comprises a code set related to an arithmetic instruction, a code set related to a logical instruction, a code set related to load and store instructions, a code set related to a transfer instruction, a code set related to a stack instruction, a code set related to input and output instructions, a code set related to a control instruction, a code set related to an interrupt instruction, and a code set related to others excluding thereof.

8. The apparatus of claim 6, wherein the spectrum analyzer previously stores a code spectrum pattern of an executable code and a code spectrum pattern of a non-executable code, compares the code spectrum inputted from the code analyzer with the stored patterns, and determines whether the network packet includes the executable code.

9. The apparatus of claim 2, wherein the protocol checker comprises:
a service mapping table configured to store statistics including statistics of an executable code for each service and for each transaction of the service; and
an abnormal packet checker configured to analyze a protocol of the network packet determined as including the executable code, to check a related service and transaction, to check the statistics in which a packet of the related service and transaction includes the executable code, and to determine whether the network packet is harmful.

10. A computer-implemented method of detecting a network attack, the computer-implemented method comprising:
determining, using a computer processor, whether a network packet includes an executable code;
determining, using a computer processor, a possibility that the executable code is included in the network packet; and
determining, using a computer processor, whether the network packet determined as including the executable code is a harmful packet based on the possibility that the executable code is included in the network packet,
wherein the determining whether a network packet includes an executable code comprises:
decoding a payload portion of the network packet as a machine code instruction to convert into a pseudo-machine code;

classifying the converted pseudo-machine code into a preset meaning set;

extracting a code spectrum of the network packet based on a result of the classifying; and determining whether the network packet includes the executable code by analyzing the extracted code spectrum.

11. The method of claim 10, wherein the determining of the possibility that the executable code is included in the network packet comprises:

analyzing a protocol of the network packet, including the executable code, and checking a related service and transaction; and checking the possibility that the executable code is included in the checked service and transaction.

12. The method of claim 10, wherein, in determining whether the network packet determined as including the executable code is a harmful packet, the network packet is determined as a normal packet when the executable code is included and the possibility that the executable code is included in the network packet is high, and the network packet is determined as the harmful packet when the executable code is included and the possibility that the executable code is included in the network packet is low.

13. The method of claim 10, wherein, in the extracting the code spectrum, a different color is given for each meaning set, and the code spectrum is displayed as the given color.

14. The method of claim 13, wherein, in the determining whether the network packet includes the executable code by analyzing the extracted code spectrum, a code spectrum pattern shown in a non-executable code and a code spectrum pattern shown in an executable code are previously stored, and the stored code spectrum pattern is compared with the extracted code spectrum pattern to determine whether the network packet includes the executable code.

15. The method of claim 10, wherein the meaning set comprises a code set related to an arithmetic instruction, a code set related to a logical instruction, a code set related to load and store instructions, a code set related to a transfer instruction, a code set related to a stack instruction, a code set related to input and output instructions, a code set related to a control instruction, a code set related to an interrupt instruction, and a code set related to others excluding thereof.

* * * * *